United States Patent [19]

Takeshima et al.

[11] 4,334,733
[45] Jun. 15, 1982

[54] COATED GLASS FIBERS FOR OPTICAL TRANSMISSION

[75] Inventors: Mikio Takeshima; Masaaki Kawase, both of Mito; Toru Yamanishi; Masaaki Yoshida, both of Yokohama, all of Japan

[73] Assignees: Nippon Telegraph & Telephone Public Corp., Tokyo; Sumitomo Electric Industries, Ltd., Osaka, both of Japan; part interest to each

[21] Appl. No.: 114,460

[22] Filed: Jan. 23, 1980

[30] Foreign Application Priority Data

Jan. 23, 1979 [JP] Japan .................................. 54-6722

[51] Int. Cl.$^3$ .............................................. G02B 5/172
[52] U.S. Cl. .............................. 350/96.33; 350/96.34; 427/163
[58] Field of Search ............... 350/96.30, 96.31, 96.33, 350/96.34, 96.23; 65/3.11, 3.41, 3.44; 427/162, 163

[56] References Cited

U.S. PATENT DOCUMENTS 3,980,390  9/1976  Yamamoto et al. ............. 350/96.33
4,105,284  8/1978  Olshansky ....................... 350/96.33
4,114,981  9/1978  Ishida et al. ..................... 350/96.33
4,213,672  7/1980  Aulich et al. .................... 350/96.23

FOREIGN PATENT DOCUMENTS 1524316  9/1978  United Kingdom ............. 350/96.33

OTHER PUBLICATIONS

Gloge, "Optical-Fiber Packaging and Its Influence on Fiber Straightness and Loss", *Bell Syst. Tech. J.*, vol. 54, No. 2, Feb. 1975, pp. 245-262.
Naruse et al., "Nylon-Jacketed Optical Fibre with Silicone Buffer Layer", *Electr. Lett.*, vol. 13, No. 6, Mar. 1977, pp. 153-154.

*Primary Examiner*—John D. Lee
*Attorney, Agent, or Firm*—Sughrue, Mion, Zinn, Macpeak and Seas

[57] ABSTRACT

In a glass fiber for optical transmission comprising a primary coat, a thermoplastic resin coat, and a buffer coat between the primary coat and the thermoplastic resin coat, the improvement which comprises said thermoplastic resin being a polyamide having a modulus of elasticity of about 2,000 to 8,000 kg/cm$^2$ at a temperature in the range of 20 to 23° C.

6 Claims, 5 Drawing Figures

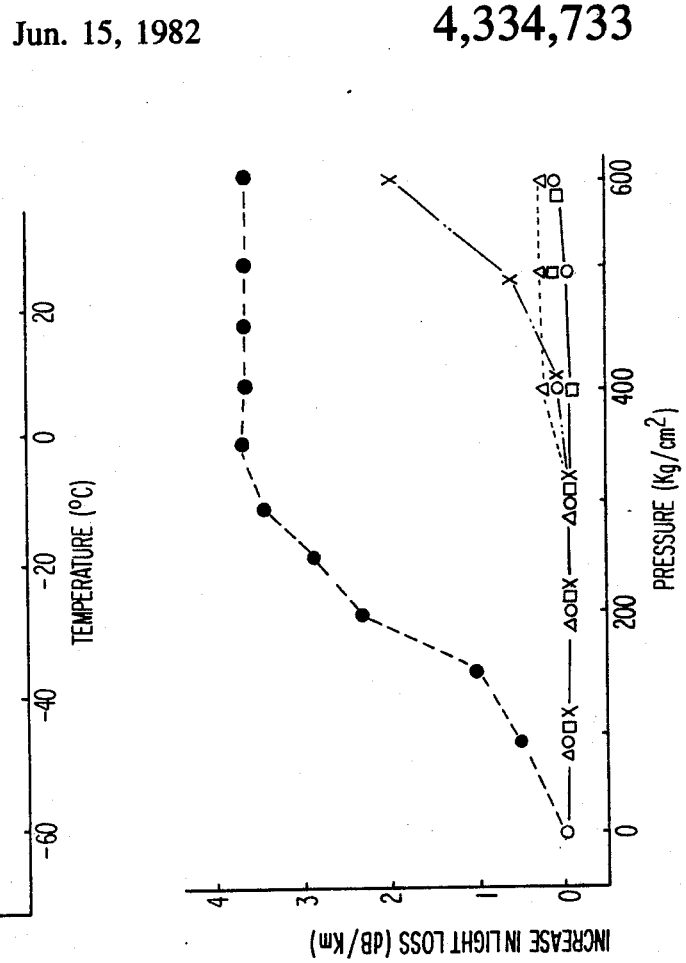
FIG 4
FIG 5
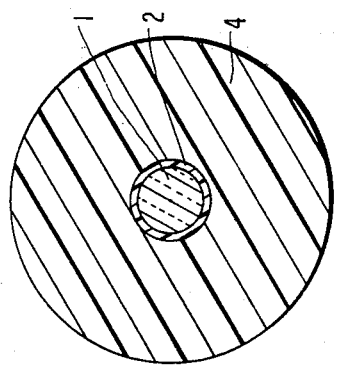
FIG 1
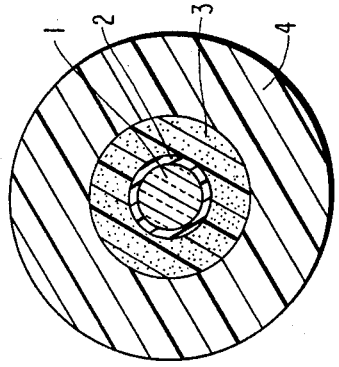
FIG 2
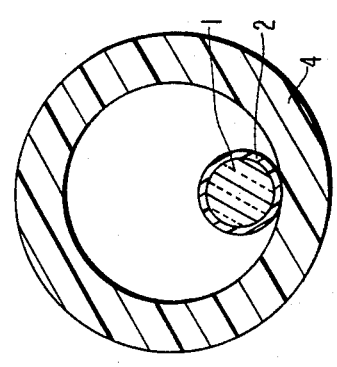
FIG 3

COATED GLASS FIBERS FOR OPTICAL TRANSMISSION

BACKGROUND OF THE INVENTION

1. Field of the Invention

This invention relates to glass fibers for optical transmission (to be hereunder referred to as an optical fiber).

2. Description of the Prior Art

Various methods have been proposed for coating optical fibers. Most of those are already implemented or expected to be implemented using a basic concept typified by the method described in U.S. Pat. No. 3,980,390. According to this method, a meltspun optical fiber, prior to its contact with another solid object, is coated with a resin composition which is further coated with a thermoplastic resin composition through melt extrusion. The first coat of the resin composition (hereunder referred to as a primary coat) formed on the fiber immediately after its spinning serves to retain the virgin strength of the glass, and the thermoplastic resin coat (hereunder referred to as a secondary coat) formed on the primary coat through extrusion enhances the mechanical strength of the fiber and protects it from subsequent mechanical stress, moisture in the air or ultraviolet radiation. The two-layer fiber system produced by this method is illustrated in FIG. 1 wherein 1 is a glass fiber, 2 is a primary coat and 4 is a secondary coat (the fiber of this type will hereunder be referred to as fiber A).

However, fiber A is known to sustain a fluctuation in transmission characteristics due to "microbending" as reported by D. Gloge et al., "Optical-fiber packaging and its influence on fiber straightness and loss", BSTJ, 54, 1975, pp. 245-262, and several methods have been proposed to improve the two-layer structure of FIG. 1. One typical example is shown in FIG. 2 wherein a buffer layer 3 made of a material having a small Young's modulus (such as a silicone resin, a rubber-like material such as butadiene resin, foamed plastic, and ethylene-vinyl acetate copolymer) capable of absorbing external stress is provided between the primary and secondary coats (a fiber of this type will hereunder be referred to as fiber B). Another example is illustrated in FIG. 3 wherein the inside diameter of the secondary coat is made larger than the outside diameter of the primary coat to provide an open space between the two coats (a fiber of this third type will hereunder be referred to as fiber C).

These improvements are characterized by mechanical isolation of the primary and secondary coats so that no external stress or stress due to the high thermal expansion coefficient of the thermoplastic resin of which the secondary coat is made is transmitted to the fiber. As already reported by research and confirmed experimentally by the inventors, unlike fiber A of the structure shown in FIG. 1, fiber B and fiber C as illustrated in FIGS. 2 and 3 sustain only a small increase in transmission loss upon application of external pressure or under cold conditions. Because of the open space provided between the primary and secondary coats, fiber C is highly resistant to microbending which occurs due to external force or thermal stress, but if the secondary coat shrinks longitudinally, the fiber will become serpentine. To make the cycle in which the fiber becomes serpentine greater than the cycle of microbending, the inside diameter of the secondary coat is increased and this results in a fiber whose outside diameter is about 2 mm, thus sacrificing the greatest advantage of optical transmission (greater transmission capacity for a unit cross-sectional area). Consequently, the inventors' efforts have been directed to improvement of fiber B.

Several thermoplastic resins that can be melt-extruded to form the secondary coats have been proposed to date, and the actual use of polyamide, high density polyethylene, polycarbonate and polyester has been reported in many prior art references because they are easy to form by extrusion, have high weatherability, and have relatively high mechanical strength. The most popular resin is the polyamide which has a relatively small thermal expansion coefficient for plastics, has been used for many years as a material in coating electric wires, and permits the use of an ordinary adhesive for splicing with a connector. The inventors have made various studies of fiber B using polyamide as the material for the secondary coat and successfully produced a fiber which is substantially free from fluctuations in transmission loss due to "microbending", namely fluctuation that occurs due to extrusion of the secondary coat and a fluctuation due to the effect of external stresses developing during the assembling and sheathing steps or cable-laying.

In addition to the resistance to microbending, the optical fiber must have stable transmission characteristics at temperatures from −40° C. to 60° C., and if it is to be used as a submarine cable, which is one possible future application of optical fibers, its characteristics must also include stability under high water pressure. According to the studies of the present inventors, fibers A, B and C when coated with polyamide suffered increased transmission loss of varying degrees when they were exposed to a temperature lower than −40° C. Fiber A experienced the greatest loss, fiber C suffered the second greatest loss, and fiber B was the least susceptible to low temperatures. A plausible reason for the increased transmission loss in fibers A and B at low temperatures is as follows: polyamides (and other thermoplastic resins) have an expansion coefficient more than 10 times greater than glass and, therefore, shrink under cold temperature and distort to cause a slight bend in the fiber which then results in an increase in transmission loss. Because of the buffer layer fiber B is far more stable than fiber A under cold temperatures, but a further improvement is necessary for fiber B to keep its characteristics stable at a temperature lower than −40° C.

When optical fibers are used in a submarine cable, if any accident should cause the cable sheath to break and sea water enters the cable, the optical fiber will be placed under a pressure proportional to the depth of water where the cable is laid. Therefore, the fiber is required to keep its stable characteristics even at a pressure higher than 100 kg/cm$^2$.

According to the studies of the present inventors, the transmission loss occurring in fibers A, B and C will increase at a water pressure higher than 100 kg/cm$^2$. The increase in transmission loss is proportional to the pressure, but the loss will diminish as the level of pressure decreases. Water pressure acts on the optical fiber equally in all directions, but the slightest heterogeneity in the nature of the coating will probably cause microbending. It was therefore concluded that the increased transmission loss at −40° C. and at a water pressure higher than 100 kg/cm$^2$ may be attributable to the same mechanism (i.e., development of microbending as a result of the clamping effect of the secondary coat on the interior). If so, the clamping-induced microbending can be prevented by either (1) enhancing to a greater extent the ability of the buffer layer of FIG. 2 to absorb external stress, in other words, using a material of even smaller Young's modulus or increasing the thickness of the buffer layer or by (2) reducing the clamping effect of the secondary coat. If the Young's modulus of the material for the buffer layer is decreased excessively, a buffer layer being formed by extrusion may come off the primary coat due to mechanical contact. In addition, the buffer layer is formed by baking a film of thermosetting resin and, therefore, a thicker buffer layer reduces the production speed of optical fibers or requires large production equipment.

SUMMARY OF THE INVENTION

This invention is the result of the inventors' efforts to provide an optical fiber free from the above-described defects of the conventional fibers and a method of producing such fiber, and it is characterized by using as a coating material a polyamide having a modulus of longitudinal elasticity between 2,000 kg/cm² and 8,000 kg/cm² at 20° to 23° C.

BRIEF DESCRIPTION OF THE DRAWINGS

FIGS. 1, 2 and 3 are cross-sectional views of three different types of conventional optical fibers.

FIG. 4 shows temperature versus transmission loss of various types of optical fibers.

FIG. 5 shows water pressure versus transmission loss of various types of optical fibers.

DETAILED DESCRIPTION OF THE INVENTION

In the present invention, the modulus of elasticity can be measured according to "Tentative Method of Testing for Tensile Properties of Plastics" as described in ASTM D638-64T using "Speed B" of 0.51 to 0.64 cm/minute and using, as a specimen, a cylindrical nylon having an outside diameter of 0.9 mm and an inside diameter of 0.4 mm such as prepared by removing the glass fiber and the silicone resin layer coated thereon from the coated fiber of Example 1 hereinafter described. In accordance with the present invention the polyamide must have a longitudinal modulus of elasticity between 2,000 kg/cm² and 8,000 kg/cm² as determined after coating at 20° to 23° C.

Illustrative polyamides that can be used in this invention include nylon 6, nylon 66, nylon 610, nylon 11 and nylon 12, copolymers of these polyamides, mixtures of these polyamides and any one of these polyamides or their mixtures containing an antioxidant, filler, plasticizer and carbon used independently or as a mixture. Preferred polyamides are polyamide copolymers such as a nylon 6/nylon 12 copolymer, nylon 66/nylon 12 copolymer, nylon 11/nylon 12 copolymer, nylon 6/nylon 66 copolymer, nylon 6/nylon 11 copolymer, and nylon 66/nylon 11 copolymer, as well as terpolymers comprising any three of the above identified nylons. More preferred are those copolymers mainly comprising nylon 11 or nylon 12. Particularly preferred polyamide copolymers are those comprising at least 80% by weight of nylon B 12. Also, particularly preferred mixtures of polyamides are those containing at least 80% by weight of nylon 12 or at least 80% by weight of a copolymer of nylon 12. These copolymers contain less moisture and have higher weatherability than nylon 6 and nylon 66, and hence are suitable as a material for coating the optical fiber which may decrease its strength in the presence of moisture.

An optical fiber coated with a polyamide having a relatively small modulus of longitudinal elasticity as specified in this invention will suffer no increase in transmission loss even if it is placed where the temperature is below $-40°$ C. or the water pressure is higher than 100 kg/cm². This can be explained by presuming that $\tau$, the clamping force of the secondary coat (polyamide) acting on the interior, is proportional to the product of strain $\epsilon$ and the elastic modulus of polyamide E. The strain $\epsilon$ is proportional to the product of the expansion coefficient of polyamide and differential temperature if the optical fiber is exposed to low temperature, and is proportional to pressure if it is placed under high water pressure. Therefore, it is impossible to alter the value of $\epsilon$ in an attempt to reduce the clamping force. But it is possible to change the elastic modulus of polyamide, and given a certain strain, a polyamide having a modulus of longitudinal elasticity less than 8,000 kg/cm² produces a clamping force which is too small to cause microbending. As will be set forth hereunder, the inventors prepared different optical fibers by varying the elastic modulus of polyamide and confirmed that a polyamide having a modulus of longitudinal elasticity lower than 8,000 kg/cm² provided an optical fiber which suffered less than 0.5 dB/km increase in transmission loss even when it was exposed to a temperature lower than $-60°$ C. and placed under a water pressure higher than 600 kg/cm². The modulus of longitudinal elasticity of the polyamide should not be lower than 2,000 kg/cm² otherwise the polyamide coat will be too soft to serve as a protective coat. The thickness of the polyamide coat is not critical although it is difficult to form a coating less than 50μ thick by melt extrusion. On the other hand, a polyamide coat having a thickness more than about 2–3 mm would not bring about any additional advantages.

The glass fiber according to the present invention comprises a primary coat of a curable organopolysiloxane composition having a refractive index higher than that of the glass forming the outermost layer of the glass fiber, a secondary coat of a polyamide and a buffer coat between the primary and secondary coats.

Generally, curable organopolysiloxane compositions having a refractive index higher than that of the glass forming the outermost layer of the glass fiber are used as the primary coat in the present invention. These polysiloxanes are characterized by the polysiloxane bond of Si-O-Si and phenyl groups as side chain substituents. A representative phenyl polysiloxane composition basically comprises

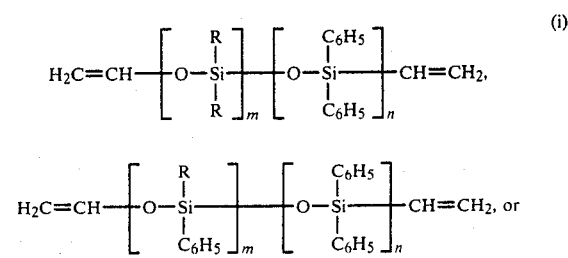

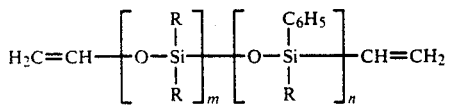

wherein R is a substituted or unsubstituted monovalent hydrocarbon group having no aliphatic unsaturation, (ii) an organohydrodiene polysiloxane component having in its molecule at least 3 hydrogen atoms directly bonded to a silicon atom contained in an amount sufficient to provide 0.7 to 5 such hydrogen atoms per vinyl group of the component (i), and (iii) a catalytic amount of platinum compound. Examples of the suitable platinum compound are those which are highly compatible with the above two components, such as an olefin complex, or a chloroplatinic acid in which part of chlorine may or may not be substituted with alcohol, aldehyde or ketone. For the purpose of increasing the mechanical strength of the cured product and fluidity of the composition, these three components may be combined with an organopolysiloxane composition comprising $(CH_2=CH)R_2SiO_{0.5}$, $R_3SiO_{0.5}$ and $SiO_2$ wherein R is a substituted or unsubstituted monovalent hydrocarbon group having no aliphatic unsaturation, the molar ratio of the sum of $(CH_2=CH)R_2SiO_{0.5}$ and $R_3SiO_{0.5}$ to $SiO_2$ being in the range of from 0.5 to 2.0 and the content of vinyl group being in the range of from 0.5 to 3 wt%. The phenyl content in this phenyl polysiloxane composition can be adjusted to control its refractive index within the range of from about 1.40 to about 1.52. In the formulae m and n are positive integers such that the phenyl polysiloxane composition has the desired refractive index and a viscosity at 25° C. of from 50 to 100,000 centistokes, preferably from 1,000 to 10,000 centistokes. The only requirement for the curable organopolysiloxane composition for the primary coat is that the composition has a refractive index higher than that of the glass which forms the outermost layer of the glass fiber, i.e., 1,458 or more.

Typical examples of phenylpolysiloxane composition are commercially available such as OF 103 (a product of Shinetsu Chemical Industry Co., Ltd., Japan) and CY-52-162 (a product of Toray Silicon Co., Ltd., Japan).

The thickness of the primary layer is preferably about 10 to 30 μm.

The buffer coat can be either (1) a phenyl polysiloxane composition as above, (2) a trifluoroalkyl group-containing curable organopolysiloxane or (3) a curable organopolysiloxane containing a substituted or unsubstituted monovalent hydrocarbon group having no aliphatic unsaturation in the side chains thereof such as dimethylpolysiloxane. The above phenyl polysiloxane composition (1) has a high heat-resistant property and a high refractive index, but is relatively expensive. The trifluoroalkyl group-containing curable organopolysiloxane also has a high heat-resistant, solvent-resistant, oil-resistant property but has a relatively low refractive index, generally less than 1.458 and, therefore, it cannot be used as a primary coat. The curable organopolysiloxane (3) has no high heat-resistant property, but is relatively inexpensive and can be cured rapidly. These materials are suitably used depending on the specific properties desired for the buffer coat. The most important difference in the requirements for the primary and buffer coatings is that the primary coat must have a refractive index of 1.458 or more which is not required for the buffer coat.

The refractive index of the buffer coat is not critical, but the polysiloxane used for the buffer coat preferably has a viscosity of about 50 to about 100,000 centistokes, more preferably 1,000 to 10,000 centistokes, at 25° C.

The polysiloxane used for the primary coat and buffer coat preferably has a Young's modulus less than 0.5 kg/mm². The buffer coat may contain a filler such as fume silica, precipitated silica, aluminum silicate, quartz powder, fused quartz powder, diatomaceous earth, calcium carbonate, titanium dioxide and carbon black. The amount of fillers in the buffer coat is preferably limited in such a manner that the modulus of polysiloxane does not exceed 0.5 kg/mm². The thickness of the buffer coat is preferably 50 to 200 μm. When the organopolysiloxane in the primary and buffer coats are the same, they may be combined into a single coating.

This invention is now described in greater detail by reference to the following examples. The optical fiber used in each example was a multimode graded fiber prepared by the chemical vapor deposition (CVD) method and which had a core diameter of 50 μm, an outside diameter of 125 μm and a specific refractivity of 1.0%. After spinning, it was coated with a silicone resin having a refractive index of 1.52 and an elastic modulus of 0.2 kg/mm² in a thickness of 20 μm and cured to form a primary coat and subsequently coated with a silicone resin having a refractive index of 1.41 and an elastic modulus of 0.2 kg/mm² in a thickness of 100 μm and cured to form a buffer layer. The so coated optical fiber is commercially available as SUMIGUIDE EG 5/4520 (a trade name of Sumitomo Electric Industries Ltd., Japan) and is designated simply "optical fiber" in the Examples.

EXAMPLE 1

A screw extruder was used to coat the optical fiber with a resin composition (Daiamide N-1940 manufactured by Daicel Ltd.) mainly consisting of a copolymer of nylon 12 of lauric lactam

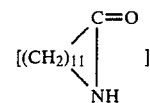

and nylon 6 of ε-caprolactam

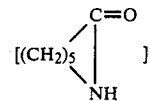

(weight ratio of nylon 12 to nylon 6 being about 8:2) until the outside diameter was 0.9 mm. The resin composition had a modulus of longitudinal elasticity of 4,000 kg/cm². The extruder used was a tubeforming die and nipple, and the extruded tubing was cooled with water at room temperature 30 cm distant from the crosshead.

EXAMPLE 2

The procedure of Example 1 was repeated to coat the optical fiber with a resin composition (Daiamide L-1940 manufactured by Daicel Ltd.) mainly consisting of nylon 12 of lauric lactam

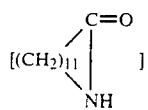

until the outside diameter was 0.9 mm. The resin composition had a modulus of longitudinal elasticity of 12,000 kg/cm².

EXAMPLE 3

The resin composition used in Example 1 was blended with the resin composition of Example 2 at varied ratios to prepare three resin compositions having moduli of longitudinal elasticity of 6,000 kg/cm², 8,000 kg/cm² and 10,000 kg/cm², and which were designated resin compositions a, b and c, respectively. The procedure of Example 1 was repeated to coat the optical fiber with each resin composition until the outside diameter was 0.9 mm. The resulting optical fibers were identified fibers a, b and c.

Lengths of 500 m of the optical fibers prepared were subjected to determination of light loss using a light emitting diode ($\lambda = 0.83$ μm). During the determination, they were placed on a methanol-dry ice coolant (for evaluation of their low-temperature characteristics) or in a pressure vessel (for evaluation of their water pressure characteristics).

The low-temperature characteristics of each of the optical fibers are shown in FIG. 4, and the hydraulic pressure characteristics of the same are described in FIG. 5, and the data on both characteristics are tabulated in Table 1. As Table 1 shows, the change in light due to the extrusion of polyamide coat was less than 0.2 dB/km in each fiber, and this was within the precision of measurement. As is clear from FIG. 4 and Table 1, the optical fibers according to Example 1, Example 3a and Example 3b suffered less than 0.5 dB/km of an increase in light loss at $-60°$ C., and this was an advantage over the fibers of Example 2 and Example 3c which experienced an increase of about 3 dB/km. The data of water pressure characteristics in FIG. 5 and Table 1 indicate that the increase in light loss occurring in the fibers according to Examples 1, 3a, and 3b is within the precision of measurement ($\pm 0.2$ dB/km) even when they were placed under a water pressure of 600 kg/cm².

TABLE 1

| Fiber | Modulus of Longitudinal Elasticity of Polyamide | Change in Light Loss due to Extrusion | Change in Light Loss at $-40°$ C. | Change in Light Loss under Water Pressure of 600 kg/cm² |
|---|---|---|---|---|
| Example 1 | 4,000 kg/cm² | +0.06 dB/km | +0.02 dB/km | +0.06 dB/km |
| Example 3a | 6,000 kg/cm² | −0.12 dB/km | +0.32 dB/km | +0.18 dB/km |
| Example 3b | 8,000 kg/cm² | +0.16 dB/km | +0.38 dB/km | +0.20 dB/km |
| Example 3c* | 10,000 kg/cm² | −0.02 dB/km | +2.0 dB/km | +2.10 dB/km |
| Example 2* | 12,000 kg/cm² | +0.08 dB/km | +2.9 dB/km | +3.7 dB/km |

*Comparisons

While the invention has been described in detail and with reference to specific embodiments thereof, it will be apparent to one skilled in the art that various changes and modifications can be made therein without departing from the spirit and scope thereof.

What is claimed is:

1. In a glass fiber for optical transmission comprising a primary coat, a thermoplastic resin coat, and a buffer coat between the primary coat and the thermoplastic resin coat, the improvement which comprises said thermoplastic resin being a polyamide having a modulus of elasticity of about 2,000 to 8,000 kg/cm² at a temperature in the range of 20° to 23° C.

2. A glass fiber for optical transmission according to claim 1, wherein said polyamide is a polyamide copolymer.

3. A glass fiber for optical transmission according to claim 2, wherein said polyamide copolymer comprises at least 80% by weight of nylon 12.

4. A glass fiber for optical transmission according to claim 1, wherein said polyamide is a mixture of polyamides.

5. A glass fiber for optical transmission according to claim 4, wherein said mixture of polyamides comprises at least 80% by weight of nylon 12.

6. A glass fiber for optical transmission according to claim 4, wherein said mixture of polyamides comprises at least 80% by weight of a copolymer of nylon 12.

* * * * *